United States Patent [19]
Makita

[11] Patent Number: 4,511,014
[45] Date of Patent: Apr. 16, 1985

[54] SYSTEM FOR CONTROLLING A POWER TRANSMISSION OF A FOUR-WHEEL DRIVE VEHICLE

[75] Inventor: Fujio Makita, Hachioji, Japan

[73] Assignee: Fuji Jukogyo Kabushiki Kaisha, Tokyo, Japan

[21] Appl. No.: 395,188

[22] Filed: Jul. 6, 1982

[30] Foreign Application Priority Data

Jul. 7, 1981 [JP] Japan ................. 56-106648

[51] Int. Cl.$^3$ .............. B60Q 1/00; B60K 31/00
[52] U.S. Cl. ................ 180/233; 180/197; 324/161; 364/426
[58] Field of Search ........ 180/233, 197, 247; 364/426, 424.1; 361/238, 242; 340/52 R; 324/160, 161

[56] References Cited

U.S. PATENT DOCUMENTS

| | | | |
|---|---|---|---|
| 3,893,535 | 7/1975 | Burckhardt et al. | 180/197 |
| 4,047,601 | 9/1977 | Fogelberg et al. | 180/233 |
| 4,086,563 | 4/1978 | Bachman | 180/197 |
| 4,312,249 | 1/1982 | Hau et al. | 364/426 |
| 4,417,641 | 11/1983 | Kageyama | 180/233 |

*Primary Examiner*—Joseph F. Peters, Jr.
*Assistant Examiner*—Donn McGiehan
*Attorney, Agent, or Firm*—Martin A. Farber

[57] ABSTRACT

A system for a four-wheel drive vehicle for automatically changing a power transmission of the engine of the vehicle from two-wheel drive system to four-wheel drive system in accordance with road surface condition and driving condition. The transmission system is provided for transmitting a power from the engine to two main driving wheels, and a clutch is provided for transmitting the power of the engine to drive two other wheels. Speed sensors are provided for producing output signals dependent on speeds of the four wheels, respectively. A steering-angle sensor is provided for producing an output signal dependent on the steering-angle. Computation circuits are provided to compute an actual slip rate from the output signals of the speed sensors and to compute a theoretical slip rate from the output of the steering-angle sensor. A comparing circuit compares the actual slip rate and the theoretical slip rate with each other and produces an output signal for a set time when the difference between both slip rates exceeds a predetermined level. The output signal operates the clutch for the engagement thereof for establishing the four-wheel drive system.

8 Claims, 7 Drawing Figures

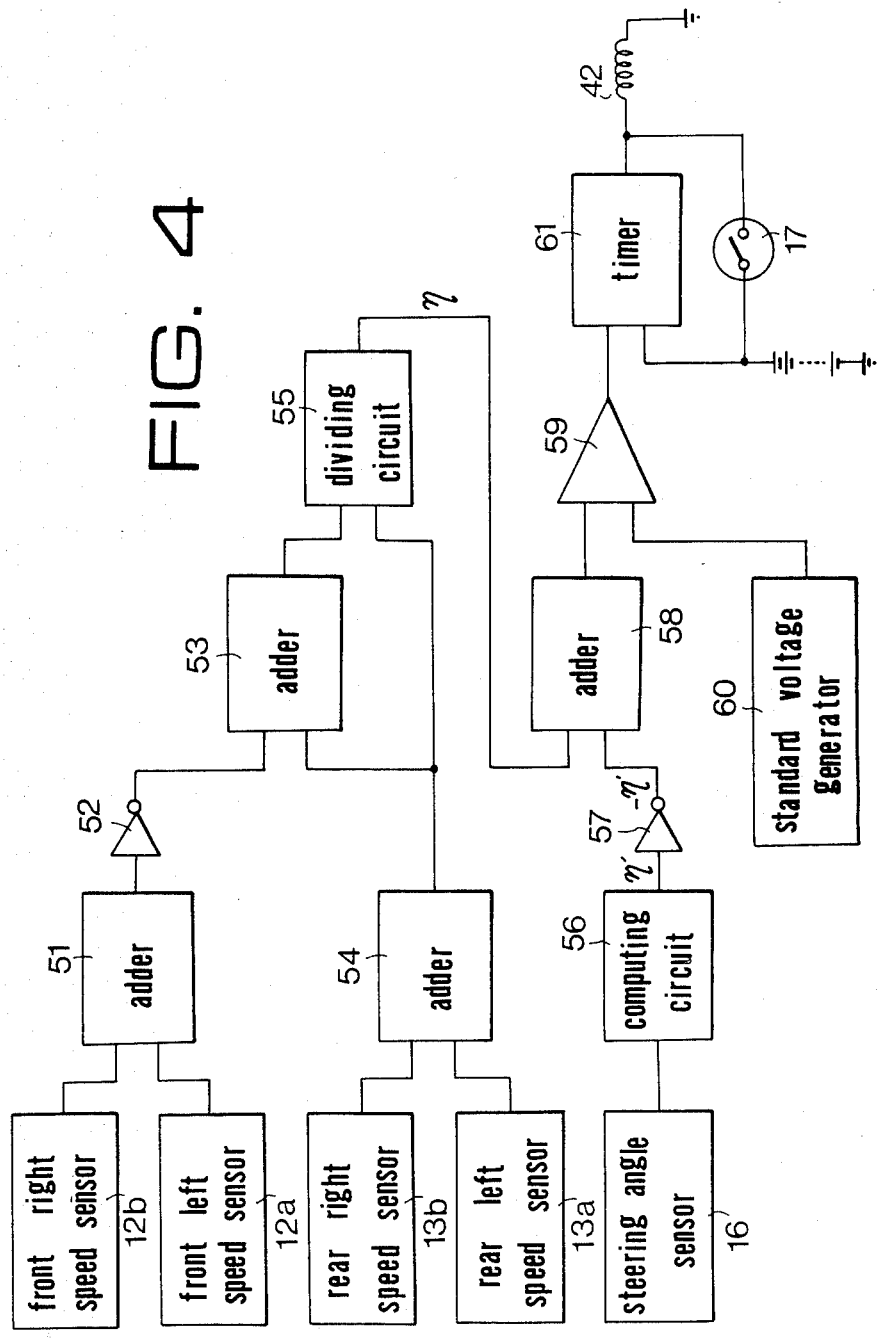

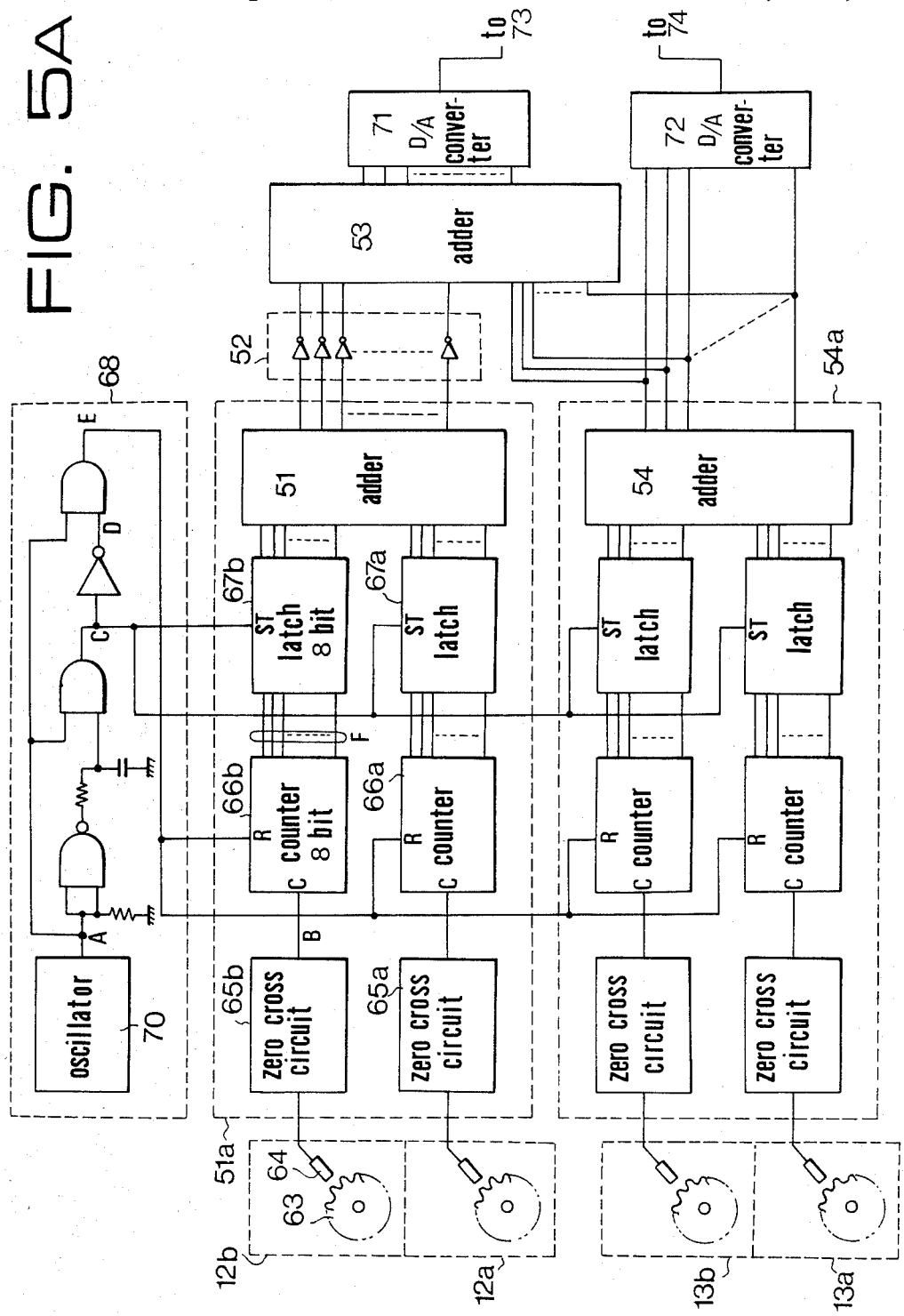

SYSTEM FOR CONTROLLING A POWER TRANSMISSION OF A FOUR-WHEEL DRIVE VEHICLE

BACKGROUND OF THE INVENTION

The present invention relates to a system for a four-wheel drive vehicle for automatically changing the transmission system of the vehicle from a two-wheel drive system to a four-wheel drive system or vice versa in accordance with driving conditions.

In a well-known four-wheel drive vehicle, a power transmission system for the two-wheel driving is selectively converted to the four-wheel drive system by engaging a clutch which is manually operated by a select lever.

Such a four-wheel drive vehicle is preferably driven by the two-wheel drive system on paved dry surfaces. If all four wheels are driven on such a dry surface, an amount of tire scrapping occurs because of slight differences in effective wheel radii caused by inevitable differences in tire inflation, tread wear or variation in an loading. This will result in increase of tire wear and fuel consumption and the generation of vibration of the vehicle body and noise. In addition, when the vehicle negotiates sharp corners, braking phenomenon called "tight corner braking" will occur. This is caused by the reason that the front wheels run through an arc of greater radius than that of the rear wheels and therefore tend to rotate faster than the rear wheels.

On the other hand, if the vehicle travels on slippery roads or icy or snowy roads during two-wheel driving, the slipping rate of each wheel increases, because of a decrease of traction of each driving tire and an increase of travelling friction on snowy roads. Therefore, an increase of fuel consumption and, a decrease of driveability and braking performance will occur.

SUMMARY OF THE INVENTION

An object of the present invention is to provide a system for controlling power transmission of a four-wheel drive vehicle which is provided with a slip detecting system for each wheel and a steering-angle sensor in order to detect the conditions of a road surface and the driving condition, such that when such conditions are detected, the power transmission is converted to the four-wheel driving system for preventing the slipping of the wheels on slippery roads and tight corner braking.

According to the present invention, speed sensors are provided for producing output signals in dependency on the speeds of four wheels respectively, and a steering-angle sensor is provided for producing an output signal dependent on the steering-angle. Output signals of the speed sensors are applied to a first computing circuit for computing an actual slip rate, and the output signals of the steering-angle sensor is applied to a second computing circuit for computing a theoretical slip rate. A comparing circuit compares the actual slip rate with the theoretical slip rate for producing an output signal when the difference between both slip rates exceeds a predetermined level. A first circuit produces an output signal in response to the output signal of the comparing circuit for a predetermined time, and a second circuit produces an output in response to the output signal of the first circuit for engaging the clutch, so that a four-wheel driving power transmission is established.

With the above and other objects and advantages in view, the present invention will become more clearly understood in connection with the detailed description of preferred embodiments, when considered with the accompanying drawings, of which:

BRIEF DESCRIPTION OF DRAWINGS

FIG. 4 is a block diagram of a control circuit for the system of the present invention;

FIGS. 5A and 5B shows an example of a circuit of FIG. 4; and

DETAILED DESCRIPTION OF THE PREFERRED EMBODIMENTS

Figure 1:
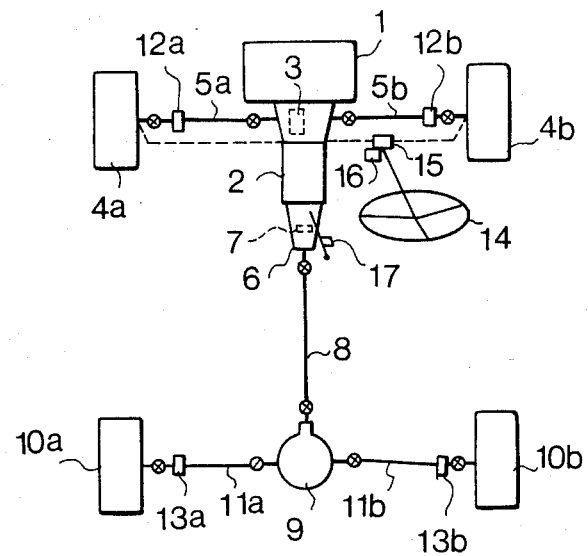
FIG. 1 is a schematic plan view showing a system according to the present invention.

Referring to FIG. 1, numeral 1 designates an internal combustion engine mounted on a vehicle. The crankshaft of the engine is connected with an input shaft of a transmission 2 through a well known mechanical clutch, which in turn is connected with a front final reduction device 3 connected to front axles 5a and 5b of the vehicle. Thus, the power of the engine 1 is transmitted to front wheels 4a and 4b of the vehicle through the transmission 2, the final reduction device 3 and the front axles 5a and 5b for establishing the front-wheel drive system. The transmission 2 is provided with a transfer device 6 for the rear-wheel drive system. The transfer device 6 has a transfer clutch 7 which operates to couple the output of the transmission 2 to a propeller shaft 8. The propeller shaft 8 is connected to rear wheels 10a and 10b through a rear final reduction device 9 and rear axles 11a and 11b.

Speed sensors 12a and 12b are provided on the front axles 5a and 5b to measure the speeds of the front wheels 4a and 4b, respectively, and speed sensors 13a and 13b are provided on rear axles 11a and 11b for measuring speeds of the rear wheels 10a and 10b. A steering-angle sensor 16 is mounted on a steering gear box 15 operatively connected to a steering wheel 14 for measuring the steering-angle. A manual switch 17 is provided in the driver's area for engaging the transfer clutch 7 for the manual conversion of the four-wheel drive system.

The principle of the present invention will be described hereinafter with reference to FIGS. 1 and 2.

An actual slip rate $\eta$ with respect to the front wheels and rear wheels is computed as $$i\ N_F = (N_{FR} + N_{FL})/2$$
$$N_R = (N_{RR} + N_{RL})/2$$
$$\eta = 1 - (N_F/N_R)$$

where $N_{FR}$ is the speed of the front right-side wheel, $N_{FL}$ is the speed of the front left-side wheel, $N_{RR}$ and $N_{RL}$ are the speeds of the rear right and left-side wheels, respectively, and $N_F$ and $N_R$ are average speeds.

The wheel speeds $N_{FR}$, $N_{FL}$, $N_{RR}$, $N_{RL}$ are detected by speed sensors 12a, 12b, 13a and 13b. Therefore, the actual slip rate $\eta$ can be computed from the output signals of the speed sensors. However, the slipping condition obtained from the signals of the speed sensors includes slipping at a corner. Accordingly, if the two-wheel drive system is changed to the four-wheel drive system when an actual slipping condition is detected, slipping of the vehicle can be prevented. However, four-wheel driving at sharp corners must be avoided even if slipping is detected in order to prevent tight corner braking. Therefore, the theoretical slip rate at corners must be calculated.

Figure 2:
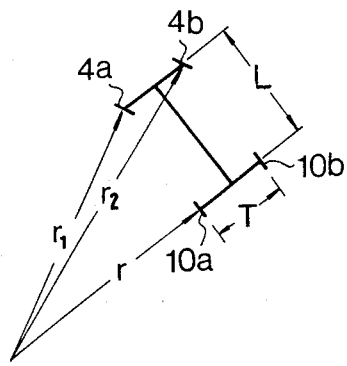
FIG. 2 is an illustration for explaining a principle of the present invention.

Referring to FIG. 2, r is the inner radius of turning of the rear wheel $10a$, $r_1$ and $r_2$ are turning radii of the front wheels $4a$ and $4b$, T is the tread, and L is the wheel base. Assuming that both treads T of the front and rear wheels are equal in length and all wheels are equal in effective wheel radius, then $$r_1 = \sqrt{r^2 + L^2}$$

$$r_2 = \sqrt{(r + T)^2 + L^2}$$

$$\omega_{FR} = (r_2/R)\dot{\theta}$$

$$\omega_{FL} = (r_1/R)\dot{\theta}$$

$$\omega_{RR} = ((r + T)/R)\dot{\theta}$$

$$\omega_{RL} = (r/R)\dot{\theta}$$

where R is the effective wheel radius, $\omega_{FR}$, $\omega_{FL}$, $\omega_{RR}$, $\omega_{RL}$ are angular velocities of the front and rear wheels respectively, and $\theta$ is the angular velocity of the turning vehicle.

Accordingly, the theoretical slip rate $\eta'$ is computed from the expression $$\eta' = (\omega_R - \omega_F)/\omega_R = 1 - (\omega_F/\omega_R)$$

Therefore, $$\eta' = 1 - \frac{\frac{r_1}{R}\dot{\theta} + \frac{r_2}{R}\dot{\theta}}{\frac{r}{R}\dot{\theta} + \frac{r+T}{R}\dot{\theta}}$$

$$= 1 - \frac{r_1 + r_2}{2r + T}$$

$$= 1 - \frac{\sqrt{r^2 + L^2} + \sqrt{(r + T)^2 + L^2}}{2r + T}$$

$$= 1 - \frac{\sqrt{X^2 + A^2} + \sqrt{(X + 1)^2 + A^2}}{2X + 1}$$

where $X = r/T$ and $A = L/T$.

"A" is determined by the specification of the body of the vehicle and "X" is determined by the turning radius. Therefore, the theoretical slip rate $\eta'$ is a function of X and is expressed as $$\eta' = g(r)$$

On the other hand, the turning radius r is a function of the steering-angle $\alpha$, that is expressed as $r = f(\alpha)$. Therefore, the theoretical slip rate $\eta'$ can be calculated by detecting the steering-angle.

An embodiment of the present invention will be explained with reference to FIGS. 3 and 4.

Figure 3:
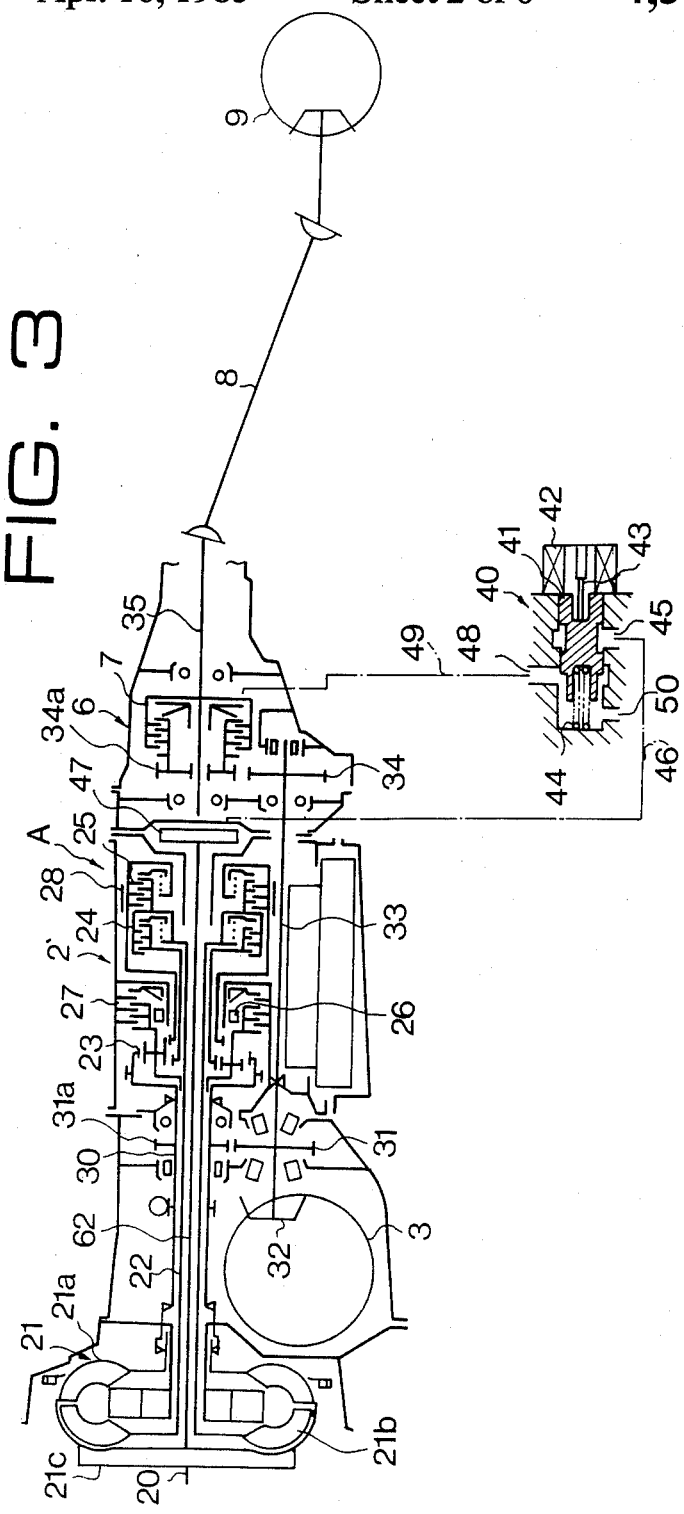
FIG. 3 is a cross-sectional view showing an embodiment of the present invention.

Referring to FIG. 3, numeral 2' generally designates an automatic transmission which comprises a torque converter 21 operatively connected to a crankshaft 20 of an engine, an automatic transmission device A, and a final reduction device 3 disposed between the automatic transmission device A and the torque converter 21.

The torque converter 21 comprises a pump impeller $21a$ and a turbine $21b$. The pump impeller $21a$ is in direct connection with the engine crankshaft 20 through a drive plate $21c$. A turbine shaft 22 extends from the turbine $21b$ to the automatic transmission device A.

The automatic transmission device A comprises a planetary gear 23, clutches 24 and 25, a one-way clutch 26, a brake 27, and a brake band 28.

The output of the automatic transmission device is transmitted to an output shaft 30 on which a gear $31a$ is securely mounted and which in turn engages with a gear 31. The gear 31 is integral with a drive pinion 32 of the final reduction device 3 for the front wheels. The drive pinion 31 is connected to a transfer drive shaft 33 which extends rearwardly and is connected to a first transfer gear 34 of the transfer device 6. The first transfer gear 34 is connected to a hydraulic clutch 7 through a second transfer gear $34a$. The hydraulic clutch 7 is adapted to be engaged by pressure oil. The driven member of the hydraulic clutch 7 is connected to the propeller shaft 8 through a rear drive shaft 35 for driving the rear wheels.

Explaining a pressure oil control system, the control system has an electromagnetic changeover valve 40. The valve 40 comprises a spool 41 connected to a rod 43 in a solenoid 42, a spring 44 to bias the spool to the right, and an inlet port 45, an outlet port 48, and a drain port 50. The inlet port 45 communicates with an oil pump 47 in the automatic transmission device A through a passage 46 and the outlet port 48 communicates with the hydraulic clutch 7 for the engagement thereof. The oil pump 47 is connected to the pump impeller $21a$ by an oil pump driving shaft 62 extending in the turbine shaft 22.

In the de-energized condition of the solenoid 42, as, the inlet port 45 is closed and the outlet port 48 communicates with the drain port 50. Thus, the hydraulic clutch 7 is disengaged. When the solenoid 42 is energized, the spool 41 is shifted to the left by the rod 43, so that the drain port 50 is closed and the inlet port 45 communicates with the outlet port 48 to engage the hydraulic clutch 7.

Referring to FIG. 4, the speed signals $N_{FR}$ and $N_{FL}$ from the speed sensors $12a$ and $12b$ of the front wheels are applied to an adder 53 through an adder 51 and an inverter 52 for summing the speed signals. The speed signals $N_{RR}$ and $N_{RL}$ from speed sensors $13a$ and $13b$ of the rear wheels are applied to the adder 53 through an adder 54 for adding the speed signals. Output signals of adders 53 and 54 are applied to a dividing circuit 55 where one of the signals is divided by the other, so that the actual slip rate $\eta$ is computed. Further, the signal dependent on the steering-angle $\alpha$ from the steering-angle sensor 16 is applied to a computing circuit 56. In the computing circuit 56, the above described data relating to the tread T and wheel base L are stored, so that the computation of above-described equation is carried out to compute the theoretical slip rate $\eta'$. The theoretical slip rate $\eta'$ is applied to an adder 58 through an inverter 57 and the actual slip rate $\eta$ is also applied to the adder 58 where $\eta - \eta'$ is computed. The output of the adder 58 is applied to a comparator 59 for comparison with a standard voltage from a standard voltage generator 60, so that the comparator 59 produces an output representing the driving condition of the vehicle and the condition of the travelling road surface. The output of the comparator 59 is connected to a timer 61, so that the timer produces an output for a set time. The output of the timer is connected to the solenoid 42 for the excitation thereof. The manual switch 17 is connected to the solenoid 42 for manually closing the solenoid circuit.

In operation, the speeds of the front and the rear wheels are measured by speed sensors 12a, 12b, 13a and 13b and the steering angle is measured by the steering angle sensor 16, so that the actual slip rate $\eta$ and the theoretical slip rate $\eta'$ are computed, and the road surface condition and the driving condition are detected. When the actual slip rate $\eta$ is small, which will occur, for example, during driving on a paved dry road, or when the theoretical slip rate $\eta'$ is large, which will occur during the negotiation of a sharp corner even if any one of the wheels slips, the comparator 59 does not produce an output signal. Accordingly, the solenoid 42 is in a de-energized state and the pressure oil is not supplied to the hydraulic clutch 7. Thus, the vehicle is driven by the front wheels only.

When the actual slip rate $\eta$ exceeds a predetermined level, the comparator 59 produces an output signal to operate the timer 61. The timer produces an output to energize the solenoid for a set time. Thus, pressure oil is supplied to the hydraulic clutch 7, so that the clutch is engaged for establishing the four-wheel drive system. Accordingly, the vehicle is driven by all four wheels for the set time of the timer. After the set time, the driving system returns to two-wheel drive system. However, if the wheels slip and the slip rate is large, the timer 61 produces the output for establishing the four-wheel driving again. On the other hand, when the manual switch 17 is closed, the solenoid 42 is energized to establish the four-wheel drive system.

Figure 5B:
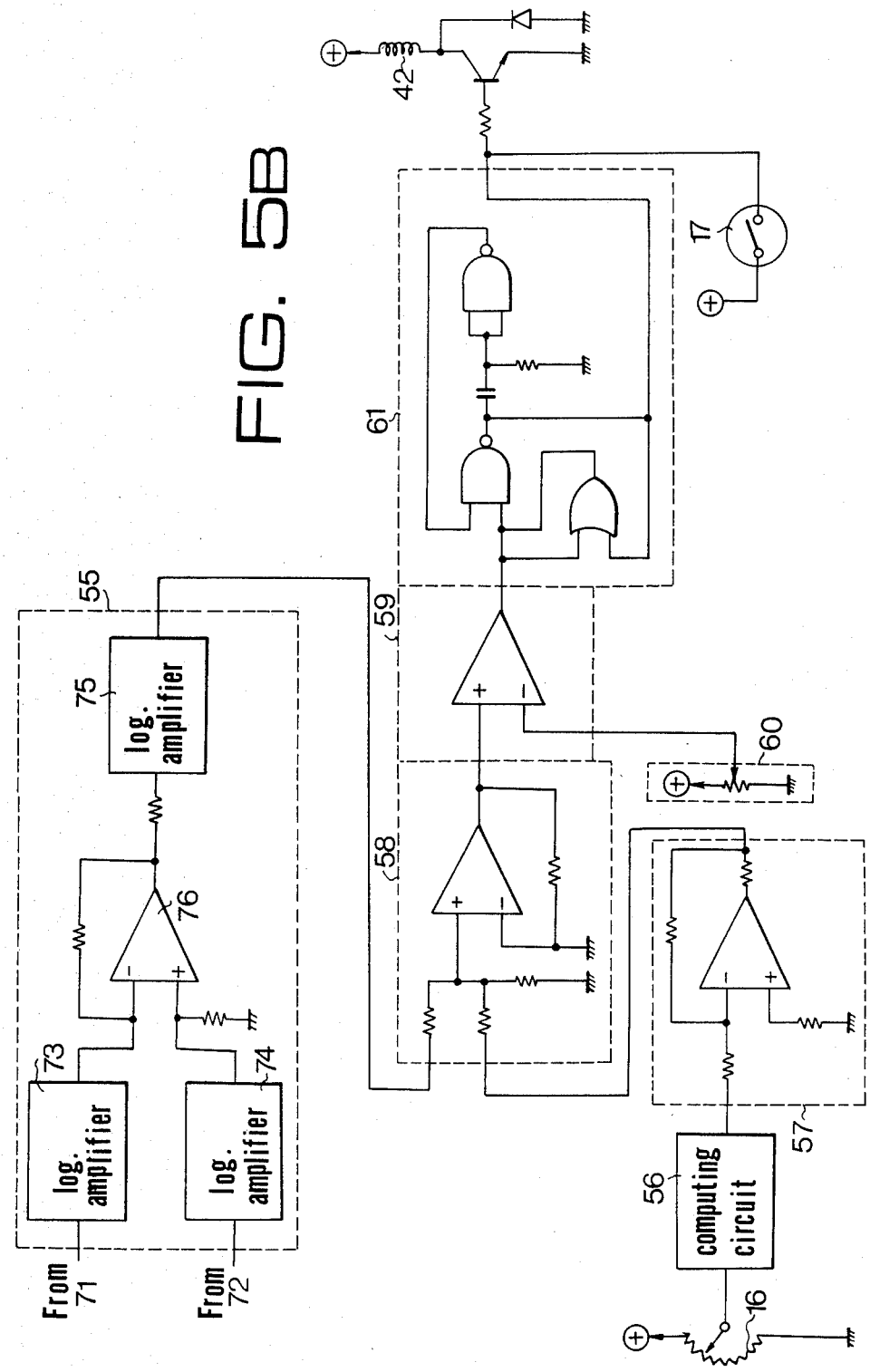
Figure 6:
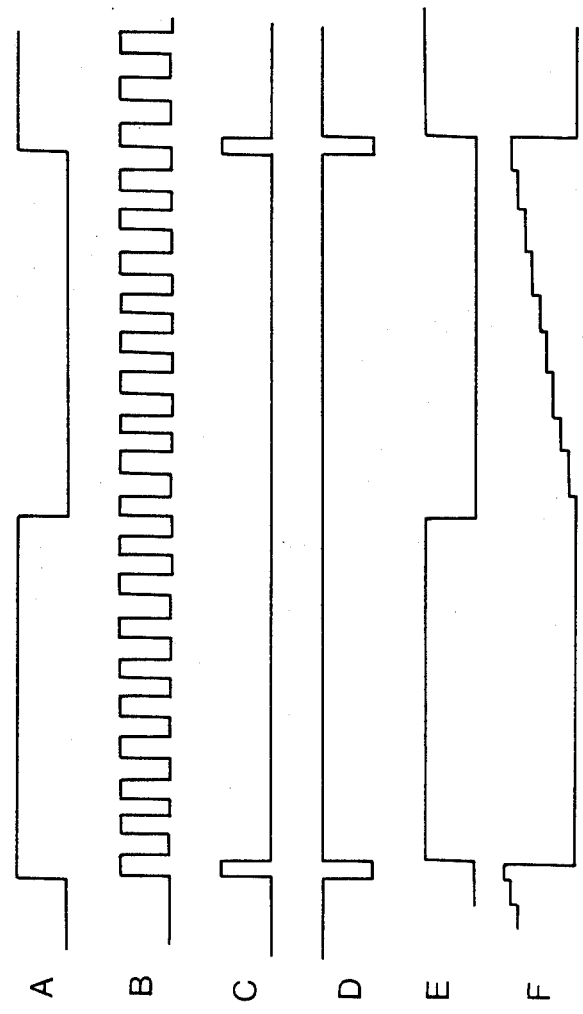
FIG. 6 shows waveforms at various locations in the circuit of FIGS. 5A and 5B.

FIGS. 5A and 5B show an example of a circuit of FIG. 4. The same parts as FIG. 4 are identified by the same numerals. The speed sensors 12a to 13b are digital speed sensors each of which comprises a gear 63 and a pickup 64. Outputs of speed sensors 12a and 12b are applied to a front-wheel average speed measuring circuit 51a, and outputs of speed sensors 13a and 13b are fed to a rear-wheel average speed measuring circuit 54a. The circuit 51a comprises a zero-cross circuit 65a, 65b, an eight-bit counter 66a, 66b, a latching circuit 67a, 67b, and the adder 51. The circuit 54a is the same as the circuit 51a. A speed measuring control circuit 68 comprises an oscillator 70 and gate circuits for producing outputs A, C, D, E (shown in FIG. 6) for controlling the circuits 51a and 54a. Thus, the counters 66a, 66b produce an output F shown in FIG. 6. Outputs of both circuits 51a and 54a are added in the adder 53 for producing a difference between the average speeds of the front and rear wheels. The outputs of the adder 53 and adder 54 are fed to the dividing circuit 55 through D/A converters 71 and 72. The dividing circuit 55 comprises logarithmic amplifiers 73, 74, 75 and an OP AMP 76. Other circuits are well-known circuits and operations thereof are the same as in FIG. 4.

Although the above described four-wheel drive system is applied to an automatic transmission, the present invention can be applied to any other types of transmission system, such as a power transmission system which normally drives rear wheels.

Further, the transfer clutch 7 may be an electromagnetic clutch.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling a power transmission of a four-wheel drive vehicle powered by an engine comprising:
   the transmission being arranged for transmitting a power of said engine to two main driving wheels;
   a clutch for selectively transmitting said power to two wheels other than said two main driving wheels;
   speed sensors for producing output signals dependent on speeds of the four wheels;
   a steering-angle sensor for producing an output signal dependent on the steering-angle;
   a first computing circuit for computing an actual slip rate from output signals of said speed sensors;
   a second computing circuit for computing a theoretical slip rate from said output signal of said steering-angle sensor;
   a comparing circuit for comparing the actual slip rate and the theoretical slip rate with each other for producing an output signal when the difference between the slip rates exceeds a predetermined level;
   a first circuit means responsive to said output signal of said comparing circuit to produce an output signal for a predetermined time; and
   a second circuit means responsive to said output signal of said first circuit means for operating said clutch for the engagement thereof. whereby four-wheel driving power transmission is established.

2. The system for controlling a power transmission of a four-wheel drive vehicle according to claim 1 wherein said clutch is an electromagnetically controlled clutch.

3. The system for controlling a power transmission of a four-wheel drive vehicle according to claim 2 wherein said clutch comprises a hydraulic clutch and an electromagnetic valve for operating the hydraulic clutch.

4. The system for controlling a power transmission of a four-wheel drive vehicle according to claim 2 wherein said clutch comprises an electromagnetic clutch.

5. The system for controlling a power transmission of a four-wheel drive vehicle according to claim 1 wherein said first circuit means includes a timer means for producing an output signal for a set time.

6. The system for controlling a power transmission of a four-wheel drive vehicle according to claim 2 further comprising a manually operated switch for operating said electromagnetically controlled clutch.

7. The system according to claim 3, further comprising
   means comprising a manually operated switch for operating said electromagnetically controlled clutch.

8. The system according to claim 7, wherein
   said manually operated switch is connected in parallel with said first circuit means.

* * * * *